(12) United States Patent
Holmstrom et al.

(10) Patent No.: US 7,141,908 B2
(45) Date of Patent: Nov. 28, 2006

(54) ROTATING ELECTRICAL MACHINE

(75) Inventors: Goran Holmstrom, Sollentuna (SE); Lars Hedendahl, Vasteras (SE); Lars Walfridsson, Vasteras (SE)

(73) Assignee: ABB AB, Vasteras (SE)

( * ) Notice: Subject to any disclaimer, the term of this patent is extended or adjusted under 35 U.S.C. 154(b) by 320 days.

(21) Appl. No.: 10/204,444

(22) PCT Filed: Mar. 1, 2001

(86) PCT No.: PCT/SE01/00442

§ 371 (c)(1),
(2), (4) Date: Dec. 3, 2002

(87) PCT Pub. No.: WO01/65660

PCT Pub. Date: Sep. 7, 2001

(65) Prior Publication Data
US 2005/0029889 A1 Feb. 10, 2005

(30) Foreign Application Priority Data
Mar. 1, 2000 (SE) .................................. 0000695

(51) Int. Cl.
H02K 1/12 (2006.01)

(52) U.S. Cl. .............................. 310/254; 174/DIG. 20; 174/DIG. 19; 310/258; 310/259; 310/179; 310/215; 310/208

(58) Field of Classification Search ................ 310/258, 310/259, 254, 216, 208, 179; 174/DIG. 20, 174/DIG. 19
See application file for complete search history.

(56) References Cited

U.S. PATENT DOCUMENTS 681,800 A 9/1901 Lasche
847,008 A 3/1907 Kitsee (Continued)

FOREIGN PATENT DOCUMENTS

AT 399790 7/1995

(Continued)

OTHER PUBLICATIONS

Shipboard Electrical Insulation; G. L. Moses, 1951, pp. 2&3.

(Continued)

Primary Examiner—Darren Schuberg
Assistant Examiner—Yahveh Comas
(74) Attorney, Agent, or Firm—Oblon, Spivak, McClelland, Maier & Neustadt, P.C.

(57) ABSTRACT

In a rotating electrical machine a stator winding is formed of flexible cables inserted in an open stator in the stator core. The stator slots extend from a radially outermost yoke part of the stator core radially inwards towards the rotor, the stator slots being separated by teeth. The stator slots are shaped as double slots with shoulders arranged in the slot walls such that each cable in the winding is secured between the previous cable in the stator slot and, seen from the slot opening, the next shoulder situated outside that particular cable. In a method for manufacturing such a winding the first cable is inserted through the opening of the stator slot and pressed firmly into a cable slot arranged at the bottom of the stator slot and designed to retain the cable when it has been pressed in. A second cable is inserted through the opening of the stator slot and secured between this first cable and an opposing securing shoulder in the wall of the slot, after which a third cable is inserted through the opening in the stator slot and secured between the second cable and a securing shoulder in the slot wall opposite the second cable, and so on.

15 Claims, 2 Drawing Sheets

U.S. PATENT DOCUMENTS

| | | |
|---|---|---|
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A * | 12/1961 | Shildneck .................... 310/64 |
| 3,098,893 A | 7/1963 | Pringle et al. |
| 3,130,335 A | 4/1964 | Rejda |
| 3,143,269 A | 8/1964 | Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 5/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,820,048 A | 6/1974 | Ohta et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,137,471 A * | 1/1979 | Sato et al. .................... 310/51 |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |

| | | | | | |
|---|---|---|---|---|---|
| 4,238,339 A | 12/1980 | Khutoretsky et al. | 4,594,630 A | 6/1986 | Rabinowitz et al. |
| 4,239,999 A | 12/1980 | Vinokurov et al. | 4,607,183 A | 8/1986 | Rieber et al. |
| 4,245,182 A | 1/1981 | Aotsu et al. | 4,615,109 A | 10/1986 | Wcislo et al. |
| 4,246,694 A | 1/1981 | Raschbichler et al. | 4,615,778 A | 10/1986 | Elton |
| 4,255,684 A | 3/1981 | Mischler et al. | 4,618,795 A | 10/1986 | Cooper et al. |
| 4,258,280 A | 3/1981 | Starcevic | 4,619,040 A | 10/1986 | Wang et al. |
| 4,262,209 A | 4/1981 | Berner | 4,622,116 A | 11/1986 | Elton et al. |
| 4,274,027 A | 6/1981 | Higuchi et al. | 4,633,109 A | 12/1986 | Feigel |
| 4,281,264 A | 7/1981 | Keim et al. | 4,650,924 A | 3/1987 | Kauffman et al. |
| 4,292,558 A | 9/1981 | Flick et al. | 4,652,963 A | 3/1987 | Fahlen |
| 4,307,311 A | 12/1981 | Grozinger | 4,656,316 A | 4/1987 | Meltsch |
| 4,308,476 A | 12/1981 | Schuler | 4,656,379 A | 4/1987 | McCarty |
| 4,308,575 A | 12/1981 | Mase | 4,663,603 A | 5/1987 | van Riemsdijk et al. |
| 4,310,966 A | 1/1982 | Brietenbach | 4,677,328 A | 6/1987 | Kumakura |
| 4,314,168 A | 2/1982 | Breitenbach | 4,687,882 A | 8/1987 | Stone et al. |
| 4,317,001 A | 2/1982 | Silver et al. | 4,692,731 A | 9/1987 | Osinga |
| 4,320,645 A | 3/1982 | Stanley | 4,723,083 A | 2/1988 | Elton |
| 4,321,426 A | 3/1982 | Schaeffer | 4,723,104 A | 2/1988 | Rohatyn |
| 4,321,518 A | 3/1982 | Akamatsu | 4,724,345 A | 2/1988 | Elton et al. |
| 4,326,181 A | 4/1982 | Allen | 4,732,412 A | 3/1988 | van der Linden et al. |
| 4,330,726 A | 5/1982 | Albright et al. | 4,737,704 A | 4/1988 | Kalinnikov et al. |
| 4,337,922 A | 7/1982 | Streiff et al. | 4,745,314 A | 5/1988 | Nakano |
| 4,341,989 A | 7/1982 | Sandberg et al. | 4,761,602 A | 8/1988 | Leibovich |
| 4,347,449 A | 8/1982 | Beau | 4,766,365 A | 8/1988 | Bolduc et al. |
| 4,347,454 A | 8/1982 | Gellert et al. | 4,771,168 A | 9/1988 | Gundersen et al. |
| 4,353,612 A | 10/1982 | Meyers | 4,785,138 A | 11/1988 | Brietenbach et al. |
| 4,357,542 A | 11/1982 | Kirschbaum | 4,795,933 A | 1/1989 | Sakai |
| 4,360,748 A | 11/1982 | Raschbichler et al. | 4,827,172 A | 5/1989 | Kobayashi |
| 4,361,723 A | 11/1982 | Hvizd, Jr. et al. | 4,845,308 A | 7/1989 | Womack, Jr. et al. |
| 4,365,178 A | 12/1982 | Lexz | 4,847,747 A | 7/1989 | Abbondanti |
| 4,367,425 A | 1/1983 | Mendelsohn et al. | 4,853,565 A | 8/1989 | Elton et al. |
| 4,367,890 A | 1/1983 | Spirk | 4,859,810 A | 8/1989 | Cloetens et al. |
| 4,368,418 A | 1/1983 | Demello et al. | 4,859,989 A | 8/1989 | McPherson |
| 4,369,389 A | 1/1983 | Lambrecht | 4,860,430 A | 8/1989 | Raschbichler et al. |
| 4,371,745 A | 2/1983 | Sakashita | 4,864,266 A | 9/1989 | Feather et al. |
| 4,384,944 A | 5/1983 | Silver et al. | 4,883,230 A | 11/1989 | Lindstrom |
| 4,387,316 A | 6/1983 | Katsekas | 4,890,040 A | 12/1989 | Gundersen |
| 4,401,920 A | 8/1983 | Taylor et al. | 4,894,284 A | 1/1990 | Yamanouchi et al. |
| 4,403,163 A | 9/1983 | Rarmerding et al. | 4,914,386 A | 4/1990 | Zocholl |
| 4,404,486 A | 9/1983 | Keim et al. | 4,918,347 A | 4/1990 | Takaba |
| 4,411,710 A | 10/1983 | Mochizuki et al. | 4,918,801 A * | 4/1990 | Schwarz et al. ............... 29/596 |
| 4,421,284 A | 12/1983 | Pan | 4,918,835 A | 4/1990 | Raschbichler et al. |
| 4,425,521 A | 1/1984 | Rosenberry, Jr. et al. | 4,924,342 A | 5/1990 | Lee |
| 4,426,771 A | 1/1984 | Wang et al. | 4,926,079 A | 5/1990 | Niemela et al. |
| 4,429,244 A | 1/1984 | Nikiten et al. | 4,942,326 A | 7/1990 | Butler, III et al. |
| 4,431,960 A | 2/1984 | Zucker | 4,949,001 A | 8/1990 | Campbell |
| 4,432,029 A | 2/1984 | Lundqvist | 4,982,147 A | 1/1991 | Lauw |
| 4,437,464 A | 3/1984 | Crow | 4,994,952 A | 2/1991 | Silva et al. |
| 4,443,725 A | 4/1984 | Derderian et al. | 4,997,995 A | 3/1991 | Simmons et al. |
| 4,470,884 A | 9/1984 | Carr | 5,012,125 A | 4/1991 | Conway |
| 4,473,765 A | 9/1984 | Butman, Jr. et al. | 5,030,813 A | 7/1991 | Stanisz |
| 4,475,075 A | 10/1984 | Munn | 5,036,165 A * | 7/1991 | Elton et al. ............ 174/102 SC |
| 4,477,690 A | 10/1984 | Nikitin et al. | 5,036,238 A | 7/1991 | Tajima |
| 4,481,438 A | 11/1984 | Keim | 5,066,881 A | 11/1991 | Elton et al. |
| 4,484,106 A | 11/1984 | Taylor et al. | 5,067,046 A | 11/1991 | Elton et al. |
| 4,488,079 A | 12/1984 | Dailey et al. | 5,083,360 A | 1/1992 | Valencic et al. |
| 4,490,651 A | 12/1984 | Taylor et al. | 5,086,246 A | 2/1992 | Dymond et al. |
| 4,503,284 A | 3/1985 | Minnick et al. | 5,091,609 A | 2/1992 | Swada et al. |
| 4,508,251 A | 4/1985 | Harada et al. | 5,094,703 A | 3/1992 | Takaoka et al. |
| 4,510,077 A | 4/1985 | Elton | 5,095,175 A | 3/1992 | Yoshida et al. |
| 4,517,471 A | 5/1985 | Sachs | 5,097,241 A | 3/1992 | Smith et al. |
| 4,520,287 A | 5/1985 | Wang et al. | 5,097,591 A | 3/1992 | Wcislo et al. |
| 4,523,249 A | 6/1985 | Arimoto | 5,111,095 A | 5/1992 | Hendershot |
| 4,538,131 A | 8/1985 | Baier et al. | 5,124,607 A | 6/1992 | Rieber et al. |
| 4,546,210 A | 10/1985 | Akiba et al. | 5,136,459 A | 8/1992 | Fararooy |
| 4,551,780 A | 11/1985 | Canay | 5,140,290 A | 8/1992 | Dersch |
| 4,552,990 A | 11/1985 | Persson et al. | 5,153,460 A | 10/1992 | Bovino et al. |
| 4,557,038 A | 12/1985 | Wcislo et al. | 5,168,662 A | 12/1992 | Nakamura et al. |
| 4,560,896 A | 12/1985 | Vogt et al. | 5,171,941 A | 12/1992 | Shimizu et al. |
| 4,565,929 A | 1/1986 | Baskin et al. | 5,175,396 A | 12/1992 | Emery et al. |
| 4,571,453 A | 2/1986 | Takaoka et al. | 5,182,537 A | 1/1993 | Thuis |
| 4,588,916 A | 5/1986 | Lis | 5,187,428 A | 2/1993 | Hutchison et al. |
| 4,590,416 A | 5/1986 | Porche et al. | 5,231,249 A | 7/1993 | Kimura et al. |

| | | | | | |
|---|---|---|---|---|---|
| 5,235,488 A | 8/1993 | Koch | DE | 482506 | 9/1929 |
| 5,246,783 A | 9/1993 | Spenadel et al. | DE | 501181 | 7/1930 |
| 5,264,778 A | 11/1993 | Kimmel et al. | DE | 523047 | 4/1931 |
| 5,287,262 A | 2/1994 | Klein | DE | 568508 | 1/1933 |
| 5,293,146 A | 3/1994 | Aosaki et al. | DE | 572030 | 3/1933 |
| 5,304,883 A | 4/1994 | Denk | DE | 584639 | 9/1933 |
| 5,305,961 A | 4/1994 | Errard et al. | DE | 586121 | 10/1933 |
| 5,321,308 A | 6/1994 | Johncock | DE | 604972 | 11/1934 |
| 5,323,330 A | 6/1994 | Asplund et al. | DE | 629301 | 4/1936 |
| 5,325,008 A | 6/1994 | Grant | DE | 673545 | 3/1939 |
| 5,325,259 A | 6/1994 | Paulsson | DE | 719009 | 3/1942 |
| 5,327,637 A | 7/1994 | Britenbach et al. | DE | 846583 | 8/1952 |
| 5,341,281 A | 8/1994 | Skibinski | DE | 875227 | 4/1953 |
| 5,343,139 A | 8/1994 | Gyugyi et al. | DE | 975999 | 1/1963 |
| 5,355,046 A | 10/1994 | Weigelt | DE | 1465719 | 5/1969 |
| 5,359,249 A * | 10/1994 | Tanaka ............ 310/216 | DE | 1807391 | 5/1970 |
| 5,365,132 A | 11/1994 | Hann et al. | DE | 2050674 | 5/1971 |
| 5,387,890 A | 2/1995 | Estop et al. | DE | 1638176 | 6/1971 |
| 5,397,513 A | 3/1995 | Steketee, Jr. | DE | 2155371 | 5/1973 |
| 5,399,941 A | 3/1995 | Grothaus et al. | DE | 2400698 | 7/1975 |
| 5,400,005 A | 3/1995 | Bobry | DE | 2520511 | 11/1976 |
| 5,408,169 A | 4/1995 | Jeanneret | DE | 2656389 | 6/1978 |
| 5,449,861 A | 9/1995 | Fujino et al. | DE | 2721905 | 11/1978 |
| 5,452,170 A | 9/1995 | Ohde et al. | DE | 137164 | 8/1979 |
| 5,468,916 A | 11/1995 | Litenas et al. | DE | 138840 | 11/1979 |
| 5,499,178 A | 3/1996 | Mohan | DE | 2824951 | 12/1979 |
| 5,500,632 A | 3/1996 | Halser, III | DE | 2835386 | 2/1980 |
| 5,510,942 A | 4/1996 | Bock et al. | DE | 2839517 | 3/1980 |
| 5,530,307 A | 6/1996 | Horst | DE | 2854520 | 6/1980 |
| 5,533,658 A | 7/1996 | Benedict et al. | DE | 3009102 | 9/1980 |
| 5,534,754 A | 7/1996 | Poumey | DE | 2913697 | 10/1980 |
| 5,545,853 A | 8/1996 | Hildreth | DE | 2920478 | 12/1980 |
| 5,550,410 A | 8/1996 | Titus | DE | 3028777 | 3/1981 |
| 5,576,584 A * | 11/1996 | Kusumoto et al. ........ 310/45 | DE | 2939004 | 4/1981 |
| 5,583,387 A | 12/1996 | Takeuchi et al. | DE | 3006382 | 8/1981 |
| 5,587,126 A | 12/1996 | Steketee, Jr. | DE | 3008818 | 9/1981 |
| 5,598,137 A | 1/1997 | Alber et al. | DE | 209313 | 4/1984 |
| 5,607,320 A | 3/1997 | Wright | DE | 3305225 | 8/1984 |
| 5,612,510 A | 3/1997 | Hildreth | DE | 3309051 | 9/1984 |
| 5,663,605 A | 9/1997 | Evans et al. | DE | 3441311 | 5/1986 |
| 5,672,926 A | 9/1997 | Brandes et al. | DE | 3543106 | 6/1987 |
| 5,689,223 A | 11/1997 | Demarmels et al. | DE | 2917717 | 8/1987 |
| 5,807,447 A | 9/1998 | Forrest | DE | 3612112 | 10/1987 |
| 5,834,699 A | 11/1998 | Buck et al. | DE | 3726346 | 2/1989 |
| 6,226,163 B1 * | 5/2001 | Bernhoff et al. ......... 361/93.1 | DE | 3925337 | 2/1991 |
| 6,559,572 B1 * | 5/2003 | Nakamura ............ 310/254 | DE | 4023903 | 11/1991 |
| | | | DE | 4022476 | 1/1992 |
| FOREIGN PATENT DOCUMENTS | | | DE | 4233558 | 3/1994 |
| BE | 565063 | 2/1957 | DE | 4402184 | 8/1995 |
| CH | 391071 | 4/1965 | DE | 4409794 | 8/1995 |
| CH | 266037 | 10/1965 | DE | 4412761 | 10/1995 |
| CH | 534448 | 2/1973 | DE | 4420322 | 12/1995 |
| CH | 539328 | 7/1973 | DE | 19620906 | 1/1996 |
| CH | 646403 | 2/1979 | DE | 4438186 | 5/1996 |
| CH | 657482 | 8/1986 | DE | 19020222 | 3/1997 |
| CH | 1189322 | 10/1986 | DE | 19547229 | 6/1997 |
| DE | 40414 | 8/1887 | DE | 468827 | 7/1997 |
| DE | 277012 | 7/1914 | DE | 134022 | 12/2001 |
| DE | 336418 | 6/1920 | EP | 049104 | 4/1982 |
| DE | 372390 | 3/1923 | EP | 0493704 | 4/1982 |
| DE | 386561 | 12/1923 | EP | 0056580 A1 | 7/1982 |
| DE | 387973 | 1/1924 | EP | 078908 | 5/1983 |
| DE | 406371 | 11/1924 | EP | 0120154 | 10/1984 |
| DE | 425551 | 2/1926 | EP | 0130124 | 1/1985 |
| DE | 426793 | 3/1926 | EP | 0142813 | 5/1985 |
| DE | 432169 | 7/1926 | EP | 0155405 | 9/1985 |
| DE | 433749 | 9/1926 | EP | 0102513 | 1/1986 |
| DE | 435608 | 10/1926 | EP | 0174783 | 3/1986 |
| DE | 435609 | 10/1926 | EP | 0185788 | 7/1986 |
| DE | 441717 | 3/1927 | EP | 0277358 | 8/1986 |
| DE | 443011 | 4/1927 | EP | 0234521 | 9/1987 |
| DE | 460124 | 5/1928 | EP | 0244069 | 11/1987 |
| | | | EP | 0246377 | 11/1987 |

| | | | | | |
|---|---|---|---|---|---|
| EP | 0265868 | 5/1988 | GB | 827600 | 2/1960 |
| EP | 0274691 | 7/1988 | GB | 854728 | 11/1960 |
| EP | 0280759 | 9/1988 | GB | 870583 | 6/1961 |
| EP | 0282876 | 9/1988 | GB | 913386 | 12/1962 |
| EP | 0309096 | 3/1989 | GB | 965741 | 8/1964 |
| EP | 0314860 | 5/1989 | GB | 992249 | 5/1965 |
| EP | 0316911 | 5/1989 | GB | 1024583 | 3/1966 |
| EP | 0317248 | 5/1989 | GB | 1053337 | 12/1966 |
| EP | 0335430 | 10/1989 | GB | 1059123 | 2/1967 |
| EP | 0342554 | 11/1989 | GB | 1103098 | 2/1968 |
| EP | 0221404 | 5/1990 | GB | 1103099 | 2/1968 |
| EP | 0375101 | 6/1990 | GB | 1117401 | 6/1968 |
| EP | 0406437 | 1/1991 | GB | 1135242 | 12/1968 |
| EP | 0439410 | 7/1991 | GB | 1147049 | 4/1969 |
| EP | 0440865 | 8/1991 | GB | 1157885 | 7/1969 |
| EP | 0469155 A1 | 2/1992 | GB | 1174659 | 12/1969 |
| EP | 0490705 | 6/1992 | GB | 1236082 | 6/1971 |
| EP | 0503817 | 9/1992 | GB | 1268770 | 3/1972 |
| EP | 0571155 | 11/1993 | GB | 1319257 | 6/1973 |
| EP | 0620570 | 10/1994 | GB | 1322433 | 7/1973 |
| EP | 0620630 | 10/1994 | GB | 1340983 | 12/1973 |
| EP | 0642027 | 3/1995 | GB | 1341050 | 12/1973 |
| EP | 0671632 | 9/1995 | GB | 1365691 | 8/1974 |
| EP | 0676777 | 10/1995 | GB | 1395152 | 5/1975 |
| EP | 0677915 | 10/1995 | GB | 1424982 | 2/1976 |
| EP | 0684679 | 11/1995 | GB | 1426594 | 3/1976 |
| EP | 0684682 | 11/1995 | GB | 1438610 | 6/1976 |
| EP | 0695019 | 1/1996 | GB | 1445284 | 8/1976 |
| EP | 0732787 | 9/1996 | GB | 1479904 | 7/1977 |
| EP | 0738034 | 10/1996 | GB | 1493163 | 11/1977 |
| EP | 0739087 A2 | 10/1996 | GB | 1502938 | 3/1978 |
| EP | 0740315 | 10/1996 | GB | 1525745 | 9/1978 |
| EP | 0749190 A2 | 12/1996 | GB | 2000625 | 1/1979 |
| EP | 0751605 | 1/1997 | GB | 1548633 | 7/1979 |
| EP | 0739087 A3 | 3/1997 | GB | 2046142 | 11/1979 |
| EP | 0749193 A3 | 3/1997 | GB | 2022327 | 12/1979 |
| EP | 0780926 | 6/1997 | GB | 2025150 | 1/1980 |
| EP | 0802542 | 10/1997 | GB | 2034101 | 5/1980 |
| EP | 0913912 A1 | 5/1999 | GB | 1574796 | 9/1980 |
| FR | 805544 | 4/1936 | GB | 2070341 | 9/1981 |
| FR | 841351 | 1/1938 | GB | 2070470 | 9/1981 |
| FR | 847899 | 12/1938 | GB | 2071433 | 9/1981 |
| FR | 916959 | 12/1946 | GB | 2081523 | 2/1982 |
| FR | 1011924 | 4/1949 | GB | 2099635 | 12/1982 |
| FR | 1126975 | 3/1955 | GB | 2105925 | 3/1983 |
| FR | 1238795 | 7/1959 | GB | 2106306 | 4/1983 |
| FR | 2108171 | 5/1972 | GB | 2106721 | 4/1983 |
| FR | 2251938 | 6/1975 | GB | 2136214 | 9/1984 |
| FR | 2305879 | 10/1976 | GB | 2140195 | 11/1984 |
| FR | 2376542 | 7/1978 | GB | 2150153 | 6/1985 |
| FR | 2467502 | 4/1981 | GB | 2268337 | 1/1994 |
| FR | 2467502 A * | 5/1981 | GB | 2273819 | 6/1994 |
| FR | 2481531 | 10/1981 | GB | 2283133 | 4/1995 |
| FR | 2556146 | 6/1985 | GB | 2289992 | 12/1995 |
| FR | 2594271 | 8/1987 | GB | 2308490 | 6/1997 |
| FR | 2708157 | 1/1995 | GB | 2332557 | 6/1999 |
| GB | 123906 | 3/1919 | HU | 175494 | 11/1981 |
| GB | 268271 | 3/1927 | JP | 60206121 | 3/1959 |
| GB | 293861 | 11/1928 | JP | 57043529 | 8/1980 |
| GB | 292999 | 4/1929 | JP | 57126117 | 5/1982 |
| GB | 319313 | 7/1929 | JP | 59076156 | 10/1982 |
| GB | 518993 | 3/1940 | JP | 59159642 | 2/1983 |
| GB | 537609 | 6/1941 | JP | 6264964 | 9/1985 |
| GB | 540456 | 10/1941 | JP | 1129737 | 5/1989 |
| GB | 589071 | 6/1947 | JP | 62320631 | 6/1989 |
| GB | 666883 | 2/1952 | JP | 2017474 | 1/1990 |
| GB | 685416 | 1/1953 | JP | 3245748 | 2/1990 |
| GB | 702892 | 1/1954 | JP | 4179107 | 11/1990 |
| GB | 715226 | 9/1954 | JP | 318253 | 1/1991 |
| GB | 723457 | 2/1955 | JP | 424909 | 1/1992 |
| GB | 739962 | 11/1955 | JP | 5290947 | 4/1992 |
| GB | 763761 | 12/1956 | JP | 6196343 | 12/1992 |
| GB | 805721 | 12/1958 | JP | 6233442 | 2/1993 |

| | | | | | | |
|---|---|---|---|---|---|---|
| JP | 6325629 | 5/1993 | | WO | WO9745931 | 12/1997 |
| JP | 7057951 | 8/1993 | | WO | WO9745932 | 12/1997 |
| JP | 7264789 | 3/1994 | | WO | WO9745933 | 12/1997 |
| JP | 8167332 | 12/1994 | | WO | WO9745934 | 12/1997 |
| JP | 7161270 | 6/1995 | | WO | WO9745935 | 12/1997 |
| JP | 8264039 | 11/1995 | | WO | WO9745936 | 12/1997 |
| JP | 9200989 | 1/1996 | | WO | WO9745937 | 12/1997 |
| JP | 8036952 | 2/1996 | | WO | WO9745938 | 12/1997 |
| JP | 8167360 | 6/1996 | | WO | WO9745939 | 12/1997 |
| LU | 67199 | 3/1972 | | WO | WO9747067 | 12/1997 |
| SE | 90308 | 9/1937 | | WO | WO 98/20598 | 5/1998 |
| SE | 305899 | 11/1968 | | WO | WO 98/20602 | 5/1998 |
| SE | 255156 | 2/1969 | | WO | WO9820595 | 5/1998 |
| SE | 341428 | 12/1971 | | WO | WO9820596 | 5/1998 |
| SE | 453236 | 1/1982 | | WO | WO9820597 | 5/1998 |
| SE | 457792 | 6/1987 | | WO | WO9820600 | 5/1998 |
| SE | 502417 | 12/1993 | | WO | WO9821385 | 5/1998 |
| SU | 792302 | 1/1971 | | WO | WO9827634 | 6/1998 |
| SU | 425268 | 9/1974 | | WO | WO9827635 | 6/1998 |
| SU | 1019553 | 1/1980 | | WO | WO9827636 | 6/1998 |
| SU | 694939 | 1/1982 | | WO | WO9829927 | 7/1998 |
| SU | 955369 A * | 8/1982 | | WO | WO9829928 | 7/1998 |
| SU | 955369 | 8/1983 | | WO | WO9829929 | 7/1998 |
| SU | 1511810 | 5/1987 | | WO | WO9829930 | 7/1998 |
| WO | WO8202617 | 8/1982 | | WO | WO9829931 | 7/1998 |
| WO | WO8502302 | 5/1985 | | WO | WO9829932 | 7/1998 |
| WO | WO9011389 | 10/1990 | | WO | 9834321 | 8/1998 |
| WO | WO9012409 | 10/1990 | | WO | WO 98/34239 | 8/1998 |
| WO | WO9101059 | 1/1991 | | WO | WO9833731 | 8/1998 |
| WO | WO9101585 | 2/1991 | | WO | WO9833736 | 8/1998 |
| WO | WO9107807 | 3/1991 | | WO | WO9833737 | 8/1998 |
| WO | WO9109442 | 6/1991 | | WO | WO9834238 | 8/1998 |
| WO | WO 91/11841 | 8/1991 | | WO | WO9834240 | 8/1998 |
| WO | WO 91/15755 | 10/1991 | | WO | WO9834241 | 8/1998 |
| WO | WO8115862 | 10/1991 | | WO | WO9834242 | 8/1998 |
| WO | WO9201328 | 1/1992 | | WO | WO9834243 | 8/1998 |
| WO | WO9203870 | 3/1992 | | WO | WO9834244 | 8/1998 |
| WO | WO9321681 | 10/1993 | | WO | WO9834245 | 8/1998 |
| WO | WO9406194 | 3/1994 | | WO | WO9834246 | 8/1998 |
| WO | WO9518058 | 7/1995 | | WO | WO9834247 | 8/1998 |
| WO | WO9522153 | 8/1995 | | WO | WO9834248 | 8/1998 |
| WO | WO9524049 | 9/1995 | | WO | WO9834249 | 8/1998 |
| WO | WO9622606 | 7/1996 | | WO | WO9834250 | 8/1998 |
| WO | WO9622607 | 7/1996 | | WO | WO9834309 | 8/1998 |
| WO | WO9630144 | 10/1996 | | WO | WO9834312 | 8/1998 |
| WO | WO9710640 | 3/1997 | | WO | WO9834315 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | 9745919 | 12/1997 | | WO | WO9834325 | 8/1998 |
| WO | WO9745288 | 12/1997 | | WO | WO9834326 | 8/1998 |
| WO | WO9745847 | 12/1997 | | WO | WO9834327 | 8/1998 |
| WO | WO9745848 | 12/1997 | | WO | WO9834328 | 8/1998 |
| WO | WO9745906 | 12/1997 | | WO | WO9834329 | 8/1998 |
| WO | WO9745907 | 12/1997 | | WO | WO9834330 | 8/1998 |
| WO | WO 9745908 | 12/1997 | | WO | WO9834331 | 8/1998 |
| WO | WO9745912 | 12/1997 | | WO | WO 98/40627 | 9/1998 |
| WO | WO9745914 | 12/1997 | | WO | WO 98/43336 | 10/1998 |
| WO | WO9745915 | 12/1997 | | WO | WO9917309 | 4/1999 |
| WO | WO9745916 | 12/1997 | | WO | WO9917311 | 4/1999 |
| WO | WO9745918 | 12/1997 | | WO | WO9917312 | 4/1999 |
| WO | WO9745919 | 12/1997 | | WO | WO9917313 | 4/1999 |
| WO | WO9745920 | 12/1997 | | WO | WO9917314 | 4/1999 |
| WO | WO9745921 | 12/1997 | | WO | WO9917315 | 4/1999 |
| WO | WO9745922 | 12/1997 | | WO | WO9917316 | 4/1999 |
| WO | WO9745923 | 12/1997 | | WO | WO9917422 | 4/1999 |
| WO | WO9745924 | 12/1997 | | WO | WO9917424 | 4/1999 |
| WO | WO9745925 | 12/1997 | | WO | WO9917425 | 4/1999 |
| WO | WO9745926 | 12/1997 | | WO | WO9917426 | 4/1999 |
| WO | WO9745927 | 12/1997 | | WO | WO9917427 | 4/1999 |
| WO | WO9745928 | 12/1997 | | WO | WO9917428 | 4/1999 |
| WO | WO9745929 | 12/1997 | | WO | WO9917429 | 4/1999 |
| WO | WO9745930 | 12/1997 | | WO | WO9917432 | 4/1999 |

| | | |
|---|---|---|
| WO | WO9917433 | 4/1999 |
| WO | WO9919963 | 4/1999 |
| WO | WO9919969 | 4/1999 |
| WO | WO9919970 | 4/1999 |
| WO | WO 99/28922 | 6/1999 |
| WO | WO 99/29005 | 6/1999 |
| WO | WO 99/29023 | 6/1999 |
| WO | WO 99/29025 | 6/1999 |
| WO | WO9927546 | 6/1999 |
| WO | WO9928919 | 6/1999 |
| WO | WO9928921 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO9929024 | 6/1999 |
| WO | WO9929026 | 6/1999 |
| WO | WO9929029 | 6/1999 |
| WO | WO9929034 | 6/1999 |

OTHER PUBLICATIONS

ABB Elkrafthandbok; ABB AB; 1988 ; pp. 274-276.
Elkraft teknisk Handbok, 2 Elmaskiner; A. Alfredsson et al; 1988, pp. 121-123.
High Voltage Cables in a New Class of Generators Powerformer; M. Leijon et al; Jun. 14, 1999; pp. 1-8.
Ohne Tranformator direkt ins Netz; Owman et al, ABB, AB; Feb. 8, 1999; pp. 48-51.
Submersible Motors and Wet-Rotor Motors for Centrifugal Pumps Submerged in the Fluid Handled; K.. Bienick, KSB; Feb. 25, 1988; pp. 9-17.
High Voltage Generators; G. Beschastnov et al; 1977; vol. 48. No. 6 pp. 1-7.
Eine neue Type von Unterwassermotoren; Electrotechnik und Maschinenbam, 49; Aug. 1931; pp. 2-3.
Problems in design of the 110-5OokV high-voltage generators; Nikiti et al; World Electrotechnical Congress; Jun. 21-27, 1977; Section 1. Paper #18.
Manufacture and Testing of Roebel bars; P Marti et al; 1960, Pub.86, vol. 8, pp. 25-31.
Hydroalternators of 110 to 220 kV Elektrotechn. Obz., vol. 64, No. 3, pp. 132-136 Mar. 1975; A. Abramov.
Design Concepts for an Amorphous Metal Distribution Transformer; E. Boyd et al; IEEE Nov. 1984.
Neue Wege zum Bau zweipoliger Turbogeneratoren bis 2 GVA, 6OkV Elektrotechnik und Maschinenbau Wien Janner 1972, Heft 1, Seite 1-11; G. Aichholzer.
Optimizing designs of water-resistant magnet wire; V. Kuzenev et al; Elektrotekhnika, vol. 59, No. 12, pp. 35-40, 1988.
Zur Entwicklung der Tauchpumpenmotoren; A. Schanz; KSB, pp. 19-24.

Direct Generation of alternating current at high voltages; R. Parsons; IEEE Journal, vol. 67 #393, Jan. 15, 1929; pp. 1065-1080.
Stopfbachslose Umwalzpumpen-ein wichtiges Element im modernen Kraftwerkbau; H. Holz, KSB 1, pp. 13-19, 1960.
Zur Geschichte der Brown Boveri-Synchron-Maschinen; Vierzig Jahre Generatorbau; Jan.-Feb. 1931 pp. 15-39.
Technik und Anwendung moderner Tauchpumpen; A. Heumann; 1987.
High capacity synchronous generator having no tooth stator; V.S. Kildishev et al; No. 1, 1977 pp. 11-16.
Der Asynchronmotor als Antrieb stopfbcichsloser Pumpen; E. Picmaus; Eletrotechnik und Maschinenbay No. 78, pp. 153-155, 1961.
Low core loss rotating flux transformer; R. F. Krause, et al; American Institute Physics J.Appl.Phys vol. 64 #10 Nov. 1988, pp. 5376-5378.
An EHV bulk Power transmission line Made with Low Loss XLPE Cable;Ichihara et al; Aug. 1992; pp. 3-6.
Underground Transmission Systems Reference Book; 1992;pp. 16-19; pp. 36-45; pp. 67-81.
Power System Stability and Control; P. Kundur, 1994; pp. 23-25;p. 767.
Six phase Synchronous Machine with AC and DC Stator Connections, Part II:Harmonic Studies and a proposed Uninterruptible Power Supply Scheme; R. Schiferl et al.;Aug. 1983 pp. 2694-2701.
Six phase Synchronous Machine with AC and DC Stator Connections, Part 1: Equivalent circuit representation and Steady-State Analysis; R. Schiferl et al; Aug. 1983; pp. 2685-2693.
Reactive Power Compensation; T. Petersson; 1993; pp. 1-23.
Permanent Magnet Machines; K. Binns; 1987; pp. 9-1 through 9-26.
Hochspannungsaniagen for Wechselstrom; 97. Hochspannungsaufgaben an Generatoren und Motoren; Roth et al; 1938; pp. 452-455.
Hochspannungsanlagen for Wechselstrom; 97. Hochspannungsaufgaben an Generatoren und Motoren; Roth et al; Spring 1959, pp. 30-33.
Neue Lbsungswege zum Entwurf grosser Turbogeneratoren bis 2GVA, 6OkV; G. Aicholzer; Sep. 1974, pp. 249-255.
Advanced Turbine-generators—an assessment; A. Appleton, et al; International Conf. Proceedings, Lg HV Elec. Sys. Paris, FR, Aug.-Sep. 1976, vol. I, Section 11-02, p. 1-9.
Fully slotless turbogenerators; E. Spooner; Proc., IEEE vol. 120 #12, Dec. 1973.
Toroidal winding geometry for high voltage superconducting alternators; J. Kirtley et al; MIT—Elec. Power Sys. Engrg. Lab for IEEE PES;Feb. 1974.
High-Voltage Stator Winding Development; D. Albright et al; Proj. Report EL339, Project 1716, Apr. 1984.
POWERFORMER™ : A giant step in power plant engineering; Owman et al; CIGRE 1998, Paper 11:1.1.
Thin Type DC/DC Converter using a coreless wire transformer; K. Onda et al; Proc. IEEE Power Electronics Spec. Conf.; Jun. 1994, pp. 330-334.
Development of extruded polymer insulated superconducting cable; Jan. 1992.
Transformer core losses; B. Richardson; Proc. IEEE May 1986, pp. 365-368.
Cloth-transformer with divided windings and tension annealed amorphous wire; T. Yammamoto et al; IEEE Translation Journal on Magnetics in Japan vol. 4, No. 9 Sep. 1989.
A study of equipment sizes and constraints for a unified power flow controller; J Bian et al; IEEE 1996.
PCT SE 91/00077, Apr. 23, 1991, Int'l Search Report.
PCT/DE 90/00279, Nov. 27, 1990 Int'l Search Report.
PCT/CN 96/00010, Oct. 23, 1996, Int'l Search Report.
PCT/FR 98/00468, Jun. 8, 1998, Int'l Search Report.
PCT/SE 98/02148, Jun. 10, 1999, Int'l Prelim. Examination Report.
A test installation of a self-tuned ac filter in the Konti-Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64-70.
Analysis of faulted Power Systems; P Anderson, Iowa State University Press/ Ames, Iowa, 1973, pp. 255-257.

36-Kv. Generators Arise from Insulation Research; P. Sidler; *Electrical World* Oct. 15, 1932, pp. 524.

Oil Water cooled 300 MW turbine generator;L.P. Gnedin et al;*Elektrotechnika*,1970, pp. 6-8.

J&P Transformer Book 11th Edition;A. C. Franklin et al; owned by Butterworth-Heinemann Ltd, Oxford Printed by Hartnolls Ltd in Great Britain 1983, pp. 29-67.

Transformerboard; H.P. Moser et al; 1979, pp. 1-19.

The Skagerrak transmission—the world's longest HVDC submarine cable link; L. Haglof et al of ASEA; ASEA Journal vol. 53, No. 1-2, 1980, pp. 3-12.

Direct Connection of Generators to HVDC Converters: Main Characteristics and Comparative Advantages; J.Arrillaga et al; *Electra* No. 149, Aug. 1993, pp. 19-37.

Our flexible friend article; M. Judge; *New Scientist,* May 10, 1997, pp. 44-48.

In-Service Performance of HVDC Converter transformers and oil-cooled smoothing reactors; G.L. Desilets et al; *Electra* No. 155, Aug. 1994, pp. 7-29.

Transformateurs a courant continu haute tension-examen des specifications; A. Lindroth et al; *Electra* No. 141, Apr. 1992, pp. 34-39.

Development of a Termination for the 77 kV-Class High Tc Superconducting Power Cable; T. Shimonosono et al; IEEE Power Delivery, vol. 12, No. 1, Jan. 1997, pp. 33-38.

Verification of Limiter Performance in Modern Excitation Control Systems; G. K. Girgis et al; IEEE Energy Conservation, vol. 10, No. 3, Sep. 1995, pp. 538-542.

A High Initial response Brushless Excitation System; T. L. Dillman et al; IEEE Power Generation Winter Meeting Proceedings, Jan. 31, 1971, pp. 2089-2094.

Design, manufacturing and cold test of a superconducting coil and its cyrostat for SMES applications; A. Bautista et al; IEEE Applied Superconductivity, vol. 7, No. 2, Jun. 1997, pp. 853-856.

Quench Protection and Stagnant Normal Zones in a Large Cryostable SMES; Y. Lvovsky et al; IEEE Applied Superconductivity, vol. 7, No. 2, Jun. 1997, pp. 857-860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp. 840-843.

High Speed Synchronous Motors Adjustable Speed Drives; ASEA Generation Pamphlet OG 135-101 E, Jan. 1985, pp. 1-4.

Billig burk motar overtonen; A. Felldin; *ERA* (TEKNIK) Aug. 1994, pp. 26-28.

400-kV XLPE cable system passes CIGRE test; ABB Article; ABB Review Sep. 1995, pp. 38.

FREQSYN—a new drive system for high power applications;J-A. Bergman et al; ASEA Journal 59, Apr. 1986, pp. 16-19.

Canadians Create Conductive Concrete; J. Beaudoin et al; *Science,* vol. 276, May 23, 1997, pp. 1201.

Fully Water-Cooled 190 MVA Generators in the Tonstad Hydroelectric Power Station; E. Ostby et al; BBC Review Aug. 1969, pp. 380-385.

Relocatable static var compensators help control unbundled power flows; R. C. Knight et al; *Transmission & Distribution,* Dec. 1996, pp. 49-54.

Investigation and Use of Asynchronized Machines in Power Systems[561] ; N.I.Blotskii et al; *Elektrichestvo,* No. 12, 1-6, 1985, pp. 90-99.

Variable-speed switched reluctance motors; P.J. Lawrenson et al; IEE proc, vol. 127, Pt.B, No. 4, Jul. 1980, pp. 253-265.

Das Einphasenwechselstromsystem hoherer Frequenz; J.G. Heft; Elektrische Bahnen eb; Dec. 1987, pp. 388-389.

Power Transmission by Direct Current;E. Uhlmann;ISBN 3-540-07122-9 Springer-Verlag, Berlin/Heidelberg/New York; 1975, pp. 327-328.

Elektriska Maskiner; F. Gustavson; Institute for Elkreafteknilk, KTH; Stockholm, 1996, pp. 3-6—3-12.

Die Wechselstromtechnik; A. Cour'Springer Verlag, Germany; 1936, pp. 586-598.

Insulation systems for superconducting transmission cables; O.Toennesen; Nordic Insulation Symposium, Bergen, 1996, pp. 425-432.

MPTC: An economical alternative to universal power flow controllers;N. Mohan; EPE 1997, Trondheim, pp. 3.1027-3.1030.

Lexikon der Technik; Luger; Band 2, Grundlagen der Elektrotechnik und Kerntechnik, 1960, pp. 395.

Das Handbuch der Lokomotiven (hungarian locomotive V40 1 'D'); B. Hollingsworth et al; Pawlak Verlagsgesellschaft; 1933, pp. 254-255.

Synchronous machines with single or double 3-phase star-connected winding fed by 12-pulse load commutated inverter. Simulation of operational behaviour; C. Ivarson et al; ICEM 1994, International Conference on electrical machines, vol. 1, pp. 267-272.

Elkrafthandboken, Elmaskiner; A. Rejminger; Elkrafthandboken, Elmaskiner 1996, 15-20.

Power Electronics—in Theory and Practice; K. Thorborg; ISBN 0-86238-341-2, 1993, pp. 1-13.

Regulating transformers in power systems—new concepts and applications; E. Wirth et al; ABB Review Apr. 1997, p. 12-20.

Tranforming transformers; S. Mehta et al; *IEEE Spectrum,* Jul. 1997, pp. 43-49.

A study of equipment sizes and constraints for a unified power flow controller; J. Bian et al; IEEE Transactions on Power Delivery, vol. 12, No. 3, Jul. 1997, pp. 1385-1391.

Industrial High Voltage; F.H. Kreuger; *Industrial High Voltage* 1991 vol. I, pp. 113-117.

Hochspannungstechnik; A. Küchler; Hochspannungstechnik, VDI Verlag 1996, pp. 365-366, ISBN 3-18-401530-0 or 3-540-62070-2.

High Voltage Engineering; N.S. Naidu; High Voltage Engineering ,second edition 1995 ISBN 0-07-462286-2, Chapter 5, pp. 91-98.

Performance Characteristics of a Wide Range Induction Type Frequency Converter; G.A. Ghoneem; Ieema Journal, Sep. 1995, pp. 21-34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp. 1-65.

Design and manufacture of a large superconducting homopolar motor; A.D. Appleton; IEEE Transactions on Magnetics, vol. 19,No. 3, Part 2, May 1983, pp. 1048-1050.

Application of high temperature superconductivity to electric motor design; J.S. Edmonds et al; IEEE Transactions on Energy Conversion Jun. 1992, No. 2 , pp. 322-329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan,* No. 63 ; 1977, pp. 6-14.

Weatherability of Polymer-Modified Mortars after Ten-Year Outdoor Exposure in Koriyama and Sapporo; Y. Ohama et al; *Science & Technology in Japan No. 63;* 1977, pp. 26-31.

SMC Powders Open New Magnetic Applications; M. Persson (Editor); *SMC Update* , vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882-1888.

Low-intensy laser-triggering of rail-gaps with magnesium-aerosol switching-gases; W. Frey; 11th International Pulse Power Conference, 1997, Baltimore, USA Digest of Technical Papers, p. 322-327.

\* cited by examiner

ROTATING ELECTRICAL MACHINE

TECHNICAL FIELD

The present invention relates to a rotating electrical machine with stator winding formed of flexible cable inserted in stator slots in the stator core, which stator slots extend from a radially outermost yoke part of the stator core radially inwards towards the rotor, and which stator slots are separated by teeth. The invention also relates to a method for manufacturing such a stator winding.

BACKGROUND ART

Electrical machines of the type mentioned above are described, for instance, in international patent application WO 97/45919. The cables forming the stator winding are suitably high-voltage cables of substantially the same type as those used for power distribution, i.e. PEX cables (PEX=cross-linked polyethylene). However, contrary to power distribution cable, the winding has no metal sheath which normally surrounds such a power distribution cable. The cable thus comprises substantially only the electrical conductor and at least one semiconducting layer on each side of the insulating layer. These machines can be built for extremely high voltages, 800 kV and higher, and for extremely high powers, up to 1500 MW.

When manufacturing the winding for such a stator, the stator is usually provided with mainly closed slots, the cable being drawn axially through the slots. In electrical machines intended for these extremely high voltages, several hundred kilovolt, the total length of cable in the stator winding will be considerable, up to several kilometers per phase. In such electrical machines the slots for the stator winding in the stator core must also be made very deep to ensure sufficient space for the required number of winding turns in the slot, and this in turn leads to the teeth that separate the slots becoming very long. Furthermore, it is essential for the function of these machines that the outermost semiconducting layer of the cable is not damaged during winding of the machine, since this layer is vital for enclosing the electric field in the winding.

In the case of machines intended for lower power, up to 30–40 MW, and lower voltages, to which the present invention relates, the stator winding is composed of a cable with considerably smaller diameter than the winding in a machine for high voltage and high power. In a generator for wind power plants of the type described, for instance, in international patent applications SE99/00943 and SE99/00944 and in published international application WO99/28919, the generator is driven directly and operates at very low speed, 10–25 rpm, which in turn means that it must be designed with a large number of poles. Many poles result in large diameter and thus high weight.

DISCLOSURE OF THE INVENTION

The object of the present invention is to eliminate the problems discussed above of high weight of the stator and extensive cable drawing therefor, and offer simplified manufacture of the type in question of electrical machine while maintaining an unbroken outer semiconducting layer for the winding.

This object is achieved with a rotating electrical machine of the type described in the introduction, with the characterizing features defined in claim 1.

Designing the stator core with open stator slots allows the stator winding to be produced by inserting the cable in the slots in radial direction. The cable need not thus be drawn axially through the slots. Furthermore by designing the slots as defined in claim 1, each new cable in the winding is secured between the previous cable in the slot and the next shoulder situated outside that particular cable. The cables are thus self-securing. Manufacture of the winding is greatly facilitated by each new cable being firmly clamped during the winding process between the previous cable and the shoulder immediately outside the cable. Furthermore, by shaping the slots in the stator core as double slots, substantially twice as many cables can be fitted into a stator slot of a certain depth than in a single slot. The slots need not therefore be as deep, resulting in shorter teeth, with less tendency to vibrate, between the slots as well as a total weight reduction for the stator core.

In accordance with an advantageous embodiment of the machine according to the invention, the stator slots and shoulders are so dimensioned that the distance between the cable inserted in the stator slot and the opposite shoulder is somewhat less, preferably some tenth of a millimeter less, than the diameter of the cable. For the securing of the cable mentioned above to function, said distance must on the one hand be somewhat less than the cable diameter. However it is of the utmost importance that the cable is not subjected to any appreciable deformation during production of the stator winding, which might lead to disastrous field concentrations, and the difference between said distance and the cable diameter should, on the other hand, be as small as possible.

In accordance with another advantageous embodiment of the machine according to the invention, an open, circular cable slot is shaped in the slot wall at the bottom of the stator slot, which cable slot has a radius corresponding substantially to the radius of the cable, and an opening that is somewhat less than 180° in order to secure the first cable in the stator slot in this cable slot. Shaping the cable opening somewhat less than 180° will ensure that the cable will be retained in the cable slot after having been pressed into the slot. However, it is important that the slot opening is sufficiently large for the cable not to be deformed when it is pressed in through the opening, which might result in the above-mentioned consequences.

In accordance with other advantageous embodiments of the machine according to the invention a profile of elastic material is inserted in the spaces between adjacent cables in the stator slot, or a sheet of elastic material is inserted between the cables in the two layers of cable in the double slot. The profile is dimensioned to absorb variations in the diameter of the cables and to keep the cable constantly pressed against the wall of the slot, and in equivalent manner the thickness of the sheet is adapted to absorb variations in the diameter of the cables and to keep the cable constantly pressed against the wall of the slot. The profile and the sheet can thus take up variations in the diameter of the cable resulting from settling, thermal expansion and deviations in the dimensions of the cable, as well as ensuring good cooling of the cable against the slot wall, and avoiding vibrations and wear damage in the cable.

In accordance with yet another advantageous embodiment of the machine according to the invention the cable comprises an insulation system surrounding a conducting core, said system comprising two semiconducting layers applied one on each side of a solid lay of insulation, the semiconducting layers constituting substantially equipotential surfaces. The electrical field is thus confined and the outer surface of the cable can be kept substantially at earth potential.

In accordance with still another advantageous embodiment of the machine according to the invention the solid insulation and its surrounding semiconducting layers have an electrical insulating strength exceeding 3 kV/mm, preferably exceeding 5 kV/mm. The dimensions of the winding can thus be kept down, despite high voltages in the winding, which in turn contributes to keeping the total dimensions of the machine down.

DESCRIPTION OF THE DRAWINGS

To explain the invention more fully, embodiments selected by way of example will now be described with reference to the accompanying drawings in which.

DESCRIPTION OF EMBODIMENTS

Figure 1:
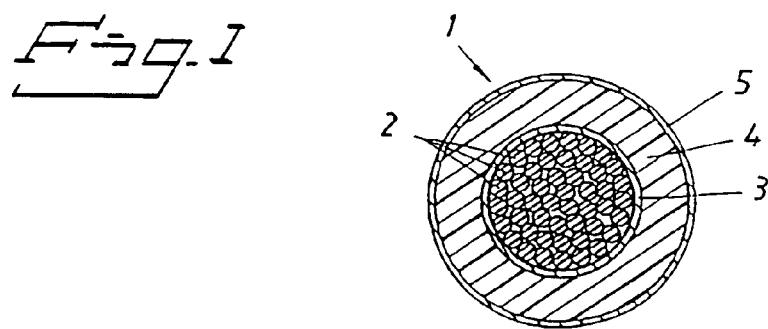
FIG. 1 shows a cross-sectional view of a cable suitable for use in the cable-wound machine in accordance with the invention.

The invention relates to a rotating electrical machine of cable-wound type. The cable 1 forming the stator winding is shown in cross section in FIG. 1 and constitutes a high-voltage cable of substantially the same type as those used for power distribution, i.e. PEX cables. The high-voltage cable 1 comprises a conducting core with a plurality of strands 2. The conductor is surrounded by an insulation system having two semiconducting layers 3, 5 applied one of each side of a solid layer of insulation 4. The cable is flexible and the semiconducting layers 3, 5 comprise substantially equipotential surfaces. This enables the electrical field to be confined so that the outer surface of the cable 1 can be kept at substantially earth potential. The solid insulation 4 and its semiconducting layers 3, 5 enclosing it have an electrical insulating strength exceeding 3 kV/mm, preferably exceeding 5 kV/mm.

The cable is thus eminently suitable for use as winding in a stator core for high voltages, while still maintaining control of the electrical field and without risk of destructive electrical partial discharges, PD, occurring.

Figure 2:
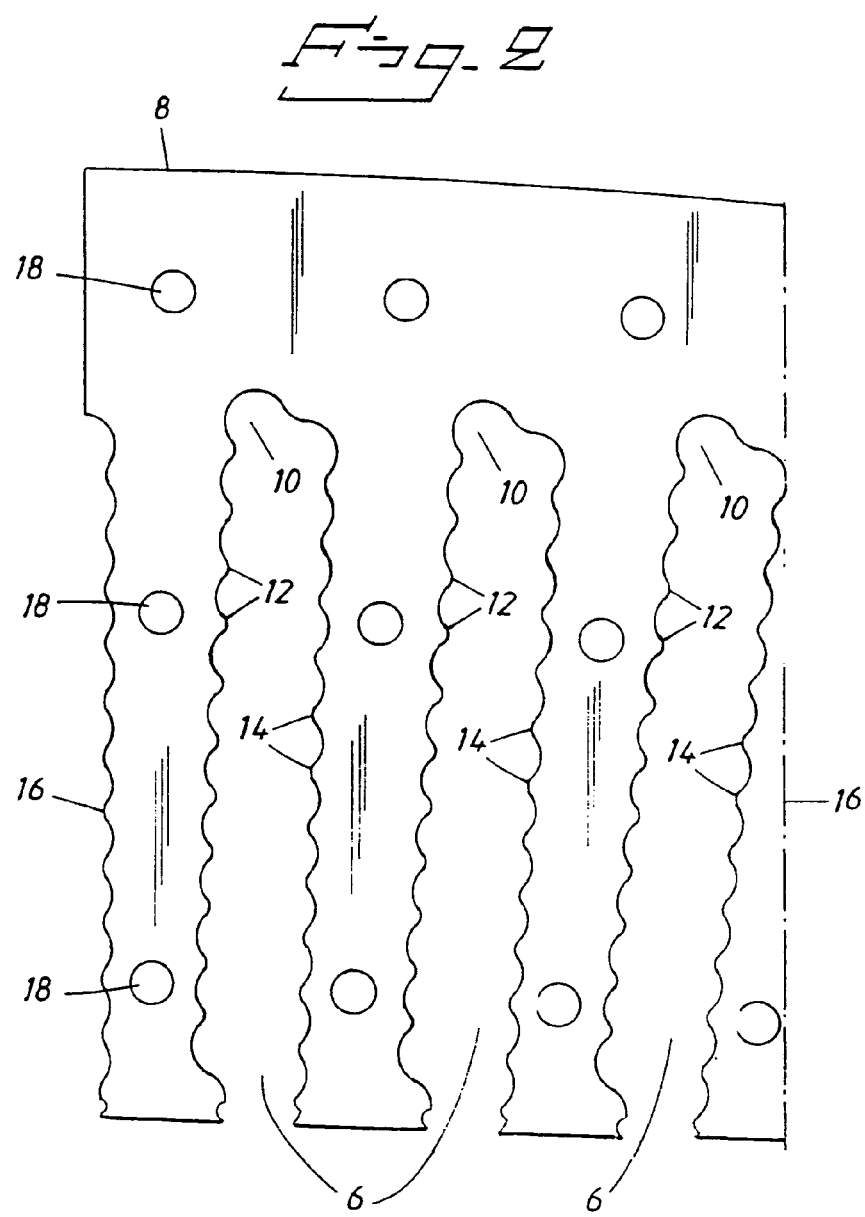
FIG. 2 shows a part of a stator lamination in a machine in accordance with the present invention.

FIG. 2 shows a part of a stator lamination in the stator core in accordance with the invention. Double slots 6 have been produced in the lamination, extending from a radially outermost yoke part 8 of the stator lamination radially inwards towards the rotor which shall be arranged in front of the openings of the slots. A cable slot 10 is shaped at the bottom of the stator slot, which cable slot has a radius corresponding substantially to the radius of the cable, so that the cable will achieve good contact with the wall of the slot. The slot opening is somewhat less than 180°. This slot 10 is intended to receive the first cable in the double slot 6 and, since the slot opening is somewhat less than 180°, the cable will be retained in this slot 10 when it has been pressed in. Shoulders 12 and 14, respectively, are arranged in the opposing walls of each slot. With the aid of these shoulders 12, 14, which are rounded with a radius of curvature that is somewhat less than the corresponding radius of the cable so that adjacent cables are in close contact with the curvature of the shoulders, each new cable inserted into the double slot 6 can be secured between a shoulder and the previous cable in the slot 6.

The double slots 6 are separated by teeth 16. Holes 18 are shown in the teeth 16 and in the yoke part of the lamination, to allow the stator laminations to be bolted together when manufacturing the stator core.

Figure 3:
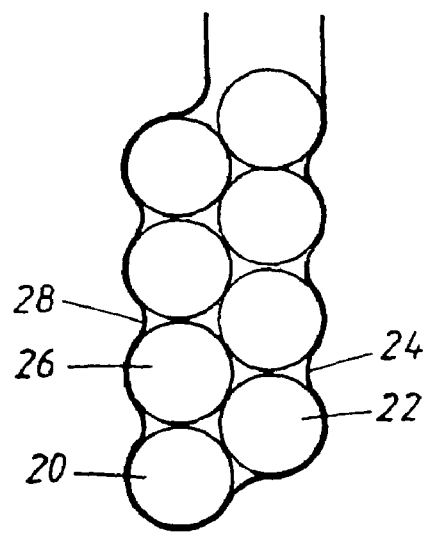
FIGS. 3–5 show various examples of insertion of the cable in the slots of the stator core of the machine in accordance with the invention.

FIG. 3 illustrates a double slot of the type shown in FIG. 2, with winding cable inserted. The first cable 20 is inserted in the cable slot at the bottom of the stator slot and secured in this cable slot as described in conjunction with FIG. 2. Next cable 22 is then secured in the stator slot upon its insertion between the cable 20 and the shoulder 24 situated next outside the cable 22. Stator slot and shoulder are so dimensioned that the distance between the cable 20 and the opposite shoulder 24 is somewhat less than the diameter of the cable 22. This distance may typically be some tenth of a millimeter less than the cable diameter. Upon insertion into the stator slot the next cable 26 is then secured between the previous cable 22 and the shoulder 28 situated next outside it, and so on.

Figure 4:
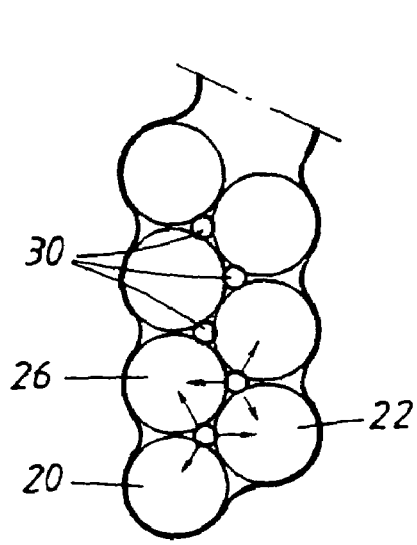

To firmly press the cables 20, 22, 26 against the wall of the slot, which is necessary in order obtain satisfactory cooling and avoid any vibrations, in the embodiment shown in FIG. 4 a profile 30 of elastic material is placed in the triangular spaces between adjacent cables. The profile 30 may be a thick-walled tube or a homogenous strip of silicon rubber or elastic cellular rubber. The profile 30 is dimensioned to absorb variations in the diameter of the cables 20, 22, 26 caused by settling, thermal expansion or deviations in dimension at manufacture.

Figure 5:
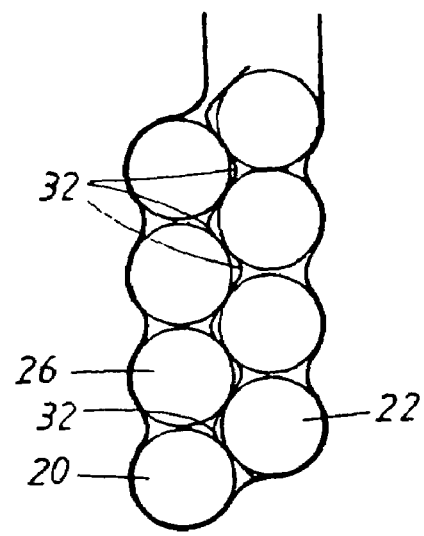

Instead of inserting profiles as illustrated in FIG. 4, a sheet 32 of elastic material such as cellular rubber may be placed between the two layers of cables 20, 26 . . . and 22 . . . respectively, in the double slot, see FIG. 5. The thickness of the sheet 32 is adapted to firmly press the cables against the slot wall in the same way as the profiles 30, in order to achieve efficient cooling and avoid vibration which can result in wear damage, and also to take up variations in the cable diameter as mentioned above. In this context it may be mentioned that the cable described has a diameter of between 16 and 25 mm and is dimensioned for a voltage level of between 10 and 50 kV. The rotating electrical machine described is suitable as a directly driven generator in a wind power plant, with a power exceeding 1 MW, preferably exceeding 1.5 MW, and particularly between 3 and 6 MW. However, the rotating electrical machine described is also suitable as a motor and is then designed within the scope of the invention for considerably higher speeds than the directly driven wind power generator where the speed of the wind power rotor is a limiting factor for the speed of the generator. The machine can also be driven with considerably higher power in motor operation.

The invention claimed is:
1. A rotating electrical machine comprising:
a stator winding formed of flexible cable inserted in stator slots in a stator core of the stator, which stator slots extend from a radially outermost yoke part of the stator core radially inwards towards the rotor, and which stator slots are separated by teeth,
wherein said stator slots are shaped as open double slots with shoulders arranged in slot walls such that a next cable turn in the stator winding is secured between a previous cable turn in the stator slot and, seen from a slot opening, a next shoulder situated outside the next cable turn.

2. A machine as claimed in claim 1, wherein the stator slot and the shoulders are dimensioned that a distance between the cable inserted in the stator slot and an opposite shoulder is less than a diameter of the cable.

3. A machine as claimed in claim 1, wherein the shoulders are rounded with a radius of curvature less than a corresponding radius of the cable.

4. A machine as claimed in claim 1, wherein an open, circular cable slot is shaped in at least one of the slot walls at a bottom of a respective stator slot, which cable slot has a radius corresponding substantially to a radius of the cable, and an opening less than 180° to secure the first winding cable in the stator slot in this cable slot.

5. A machine as claimed in claim 1, wherein a profile of elastic material is inserted in spaces between adjacent cables in the stator slots.

6. A machine as claimed in claim 5, wherein the profile comprises a thick-walled tube.

7. A machine as claimed in claim 5, wherein the profile comprises a homogenous strip.

8. A machine as claimed in claim 5, wherein the profile comprises silicon rubber.

9. A machine as claimed in claim 5, wherein the profile comprises elastic cellular rubber.

10. A machine as claimed in claim 5, wherein the profile is dimensioned to absorb variations in a diameter of the cables and to keep the cable constantly pressed against the wall of the slot.

11. A machine as claimed in claim 1, wherein a sheet of elastic material is inserted between the cables in two layers of cable in the double slot.

12. A machine as claimed in claim 11, wherein the sheet comprises cellular rubber.

13. A machine as claimed in claim 11, wherein a thickness of the sheet is configured to absorb variations in a diameter of the cables and to keep the cable constantly pressed against the wall of the slot.

14. A machine as claimed in claim 1, wherein the cable comprises an insulation system surrounding a conducting core, said insulation system comprising two semiconducting layers applied one on each side of a solid layer of insulation, the semiconducting layers forming essentially equipotential surfaces.

15. A machine as claimed in claim 14, wherein the solid insulation and surrounding semiconducting layers have an electrical insulating strength exceeding 3 kv/mm.

* * * * *